US012656554B2

(12) United States Patent
Picard

(10) Patent No.: US 12,656,554 B2
(45) Date of Patent: Jun. 16, 2026

(54) POLARIZATION CONTROL IN OPTICAL COUPLERS

(71) Applicant: Ciena Corporation, Hanover, MD (US)

(72) Inventor: Marie-Josee Picard, L'Ancienne-Lorette (CA)

(73) Assignee: Ciena Corporation, Hanover, MD (US)

( * ) Notice: Subject to any disclaimer, the term of this patent is extended or adjusted under 35 U.S.C. 154(b) by 314 days.

(21) Appl. No.: 18/404,119

(22) Filed: Jan. 4, 2024

(65) Prior Publication Data

US 2025/0224564 A1 Jul. 10, 2025

(51) Int. Cl.
*G02B 6/293* (2006.01)

(52) U.S. Cl.
CPC ..... *G02B 6/29302* (2013.01); *G02B 6/29332* (2013.01)

(58) Field of Classification Search
CPC .................................................. G02B 6/29302
See application file for complete search history.

(56) References Cited

U.S. PATENT DOCUMENTS

| | | | |
|---|---|---|---|
| 7,072,532 B2 | 7/2006 | Watts | |
| 7,680,371 B2 | 3/2010 | Cheben et al. | |
| 7,792,403 B1 | 9/2010 | Little et al. | |
| 8,503,839 B2 | 8/2013 | Cheben et al. | |
| 8,948,549 B2 | 2/2015 | Picard et al. | |
| 9,122,006 B1 | 9/2015 | Roth et al. | |
| 9,184,560 B2 * | 11/2015 | Kono ................. | H01S 5/34333 |
| 9,703,047 B2 | 7/2017 | Painchaud et al. | |
| 9,759,864 B2 | 9/2017 | Painchaud et al. | |
| 10,955,615 B2 | 3/2021 | Picard et al. | |
| 12,085,758 B1 * | 9/2024 | Wrigley ................. | H01P 1/173 |
| 2015/0338577 A1 | 11/2015 | Shi et al. | |
| 2018/0231713 A1 | 8/2018 | Picard | |
| 2022/0334313 A1 | 10/2022 | Su et al. | |

OTHER PUBLICATIONS

C. R. Doerr et al., "Tapered dual-core fiber for efficient and robust coupling to InP photonic integrated circuits," IEEE Xplore, 2009 Conference on Optical Fiber Communication, pp. 1-3, 2009, DOI: 10.1364/OFC.2009.OThN5.
M.-J. Picard et al., "Novel spot-size converter for optical fiber to sub-μm silicon waveguide coupling with low loss, low wavelength dependence and high tolerance to alignment", 2015 European Conference on Optical Communication (ECOC), pp. 1-3, Sep. 2015, DOI:10.1109/ECOC.2015.7341650.

(Continued)

*Primary Examiner* — Lisa M Caputo
(74) *Attorney, Agent, or Firm* — Young Basile Hanlon & MacFarlane, P.C.

(57) ABSTRACT

A method comprises: receiving a first optical wave into a first waveguide that confines the first optical wave to a first mode over a first portion of a coupling region; evanescently coupling the first optical wave, over the coupling region, from the first mode to a second mode confined by a second waveguide; and over at least a portion of the coupling region, rotating a polarization of an electric field of the first optical wave by approximately 90 degrees independently from an initial direction of polarization of the electric field of the first optical wave when received into the first waveguide.

17 Claims, 16 Drawing Sheets

(56)          References Cited

OTHER PUBLICATIONS

M.-J. Picard et al., "CMOS-compatible spot-size converter for optical fiber to sub-μm silicon waveguide coupling with low-loss low-wavelength dependence and high tolerance to misalignment", Society of Photo-Optical Instrumentation Engineers (SPIE) Conference Series, Silicon Photonics XI, pp. 1-7, 2016, DOI: 10.1117/12.2208629.
D. Dai et al., "Mode conversion in tapered submicron silicon ridge optical waveguides", Opt. Express, vol. 20, No. 12, pp. 13425-13439, 2012, DOI: 10.1364/OE.20.013425.

* cited by examiner

POLARIZATION CONTROL IN OPTICAL COUPLERS

TECHNICAL FIELD

This disclosure relates to polarization control in optical couplers.

BACKGROUND

Complementary metal-oxide-semiconductor (CMOS) processes and other fabrication techniques can be used to fabricate electronic integrated circuits that operate using electrical signals (e.g., voltage signals and/or current signals). Similar fabrication techniques can be used to fabricate photonic integrated circuits (PICs) in a silicon photonic platform or in other integrated photonic platforms. A silicon on insulator platform is an example of a silicon photonic platform that can be used to make opto-electrical active devices, optical passive devices, and optical waveguides in a silicon layer. In a silicon on insulator platform, the optical signals can be transmitted by optical waveguides and can be confined within the silicon layer, for example, because there is an underlying buried oxide (BOX) layer made up of thermal silicon dioxide (i.e., silicon oxidized using a thermal process) and an overlying silicon dioxide cladding surrounding the silicon layers. In such examples, the index contrast between the high index of refraction of silicon and the low index of refraction of silicon dioxide can be responsible for the confinement. Some advantages of silicon photonic platforms are the ability to make both active and passive devices, and the ability to make compact PICs due to the high index contrast between silicon and silicon dioxide.

SUMMARY

In one aspect, in general, an article of manufacture comprises: a first waveguide configured to confine, over a first region, a first optical wave to a first mode and a second optical wave to a second mode, where the first mode is characterized by a first polarization of an electric field, and the second mode is characterized by a second polarization of an electric field perpendicular to the first polarization; and a second waveguide configured to confine, over a second region, the first optical wave to a third mode and the second optical wave to a fourth mode, where the third mode is characterized by a third polarization of an electric field perpendicular to the first polarization, and the fourth mode is characterized by a fourth polarization of an electric field perpendicular to the second polarization; where a portion of the first waveguide and a portion of the second waveguide are located in proximity to each other over a coupling region and are configured to (1) evanescently couple the first optical wave from the first mode to the third mode over the coupling region and (2) evanescently couple the second optical wave from the second mode to the fourth mode over the coupling region.

Aspects can include one or more of the following features.

Where the second waveguide is optically coupled to an optical fiber.

Where the second waveguide comprises silicon nitride or silicon oxynitride, and the first waveguide comprises silicon.

Where the second waveguide comprises two or more rod structures.

Where a portion of the first waveguide, a portion of the second waveguide, and a portion of the third waveguide are located in proximity to each other over the coupling region, and the third waveguide is located between the first waveguide and the second waveguide.

Where the first waveguide comprises a waveguide core structure located on top of a waveguide slab structure, and at least one of a width of the waveguide core structure or a width of the waveguide slab structure spatially varies.

Where at least a portion of the waveguide slab structure is characterized by a first width on a first side of the waveguide core structure and a second width on a second side of the waveguide core structure, and the first width is different from the second width.

Where at least a portion of the waveguide slab structure is characterized by a first height on a first side of the waveguide core structure and a second height on a second side of the waveguide core structure, and the first height is different from the second height.

Where at least a portion of the waveguide slab structure is characterized by a first index of refraction on a first side of the waveguide core structure and a second index of refraction on a second side of the waveguide core structure, and the first index of refraction is different from the second index of refraction.

Where at least a portion of the first waveguide is characterized by a first index of refraction on a first side of the first waveguide and a second index of refraction on a second side of the first waveguide, and the first index of refraction is different from the second index of refraction.

Where the first waveguide comprises a waveguide core structure and one or more auxiliary waveguide core structures, and the auxiliary waveguide core structures are arranged asymmetrically with respect to the waveguide core structure.

Where a diameter of the first mode and a diameter of the second mode are each smaller than a diameter of the third mode and a diameter of the fourth mode by a factor of at least two.

Where over at least a portion of the coupling region, the first waveguide and second waveguide are configured to rotate a polarization of an electric field of the first optical wave by approximately 90 degrees independently from an initial direction of polarization of the electric field of the first optical wave when received into the first waveguide.

Where a portion of the first waveguide and a portion of the second waveguide are located in proximity to each other over the coupling region and are separated by a distance less than respective transverse spatial intensity patterns associated with the first mode, the second mode, the third mode, and the fourth mode.

In another aspect, in general, a method comprises: receiving, into a first waveguide, a first optical wave and a second optical wave; confining, with the first waveguide, the first optical wave to a first mode and the second optical wave to a second mode over a first region, where the first mode is characterized by a first polarization of an electric field, and the second mode is characterized by a second polarization of an electric field perpendicular to the first polarization; confining, with the second waveguide, the first optical wave to a third mode and the second optical wave to a fourth mode over a second region, where the third mode is characterized by a third polarization of an electric field perpendicular to the first polarization, and the fourth mode is characterized by a fourth polarization of an electric field perpendicular to the second polarization; and evanescently coupling, over a coupling region, (1) the first optical wave from the first mode to the third mode and (2) the second optical wave from the second mode to the fourth mode.

Aspects can include one or more of the following features.

Where a diameter of the first mode and a diameter of the third mode differ by at least a factor of two, and a diameter of the second mode and a diameter of the fourth mode differ by at least a factor of two.

Where a portion of the first waveguide and a portion of the second waveguide are located in proximity to each other over the coupling region and are separated by a distance less than respective transverse spatial intensity patterns associated with the first mode, the second mode, the third mode, and the fourth mode.

In another aspect, in general, a method comprises: receiving a first optical wave into a first waveguide that confines the first optical wave to a first mode over a first portion of a coupling region; evanescently coupling the first optical wave, over the coupling region, from the first mode to a second mode confined by a second waveguide; and over at least a portion of the coupling region, rotating a polarization of an electric field of the first optical wave by approximately 90 degrees independently from an initial direction of polarization of the electric field of the first optical wave when received into the first waveguide.

Aspects can include one or more of the following features.

Where a diameter of the first mode and a diameter of the second mode differ by at least a factor of two.

Where a portion of the first waveguide and a portion of the second waveguide are located in proximity to each other over the coupling region and are separated by a distance less than respective transverse spatial intensity patterns associated with the first mode and the second mode.

Aspects can have one or more of the following advantages.

The polarization changing spot size converter (PCSSC) disclosed herein can enable lower optical coupling losses and enhanced control over polarization within a photonic integrated circuit (PIC). In general, spot size converters (SSCs) may have local stresses and/or defect-based waveguide asymmetries (e.g., due to fabrication imperfections) that can lead to uncontrolled conversion between transverse electric (TE) and transverse magnetic (TM) modes of an optical wave. Such uncontrolled conversion can result in partial conversion and/or multiple modes or superpositions of modes being present in the optical wave after traversing the SSC. In general, if the optical wave is not propagating adiabatically in a supported mode (e.g., a TE mode or a TM mode of a waveguide), PICs and externally coupled optical elements can be negatively impacted by optical loss or by partial coupling into another supported mode which induces interference, for example. The PCSSC can reduce such issues by controlling the conversion between TE and TM modes such that a TE mode is converted to a TM mode and a TM mode is converted to a TE mode. By incorporating one or more PCSSCs in a PIC, especially in products that require a smaller optical power budget, the known good die (KGD) yield may be increased. For example, one metric that may be improved by the PCSSC is polarization rotation, which can have a high impact on the KGD yield. In some PICs comprising PCSSCs, the coupling efficiency stability during reliability tests, particularly in harsh environments, may be enhanced.

The PCSSC can have a substantially reduced dependence on asymmetries in the sidewalls of waveguides, thereby allowing for the relaxation of fabrication requirements associated with the control of the sidewalls. In some examples, the PCSSC may be implemented with existing process flows and design rules (e.g., a laser trimming process at the wafer level is not necessarily required). Furthermore, the PCSSC can enable a substantial reduction in the optical return loss (ORL) of a PIC, which depends on the amount of light reflected from the PIC. A reduction in ORL can result in increased performance of an optical source (e.g., a laser may generate less noise if less light is reflected back from the PIC towards it). In terms of manufacturing cost, the implementation of PCSSCs in PICs can reduce such costs by improving the PIC wafer yields. For example, the PIC wafer yields of KGDs can be improved by reducing the die failure rate associated with polarization energy transfer metrics.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
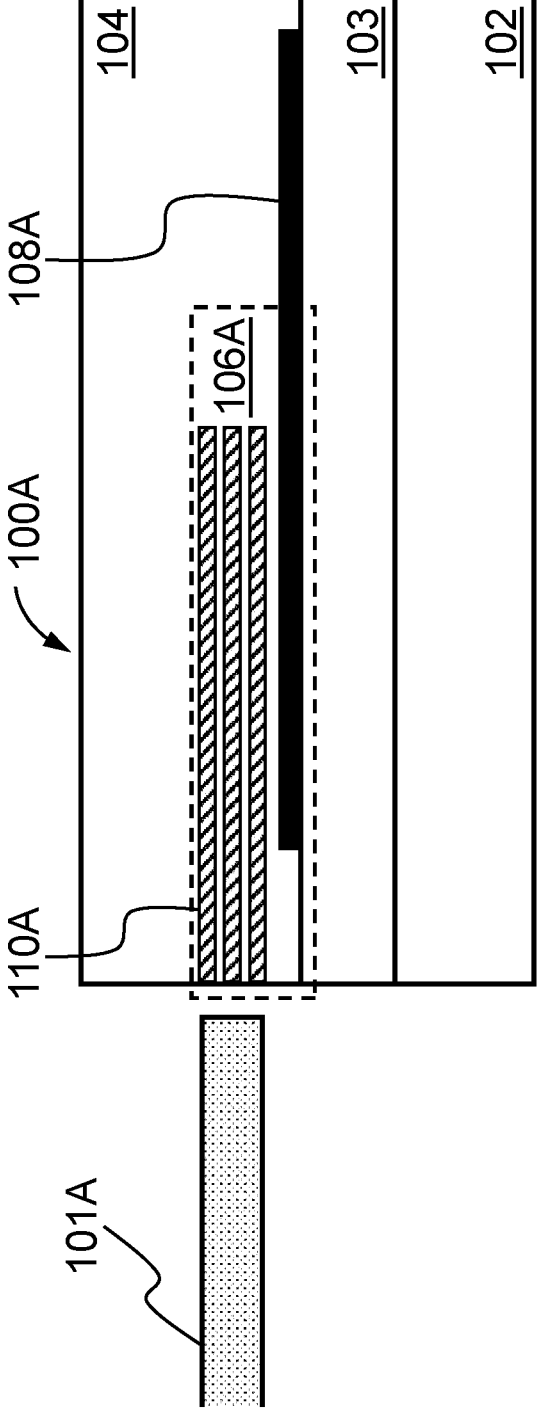
FIG. 1A is a schematic diagram of an example photonic integrated circuit optically coupled to an external optical fiber.

Photonic integrated circuits (PICs) often include waveguides for transmitting optical waves to and from photonic devices. A waveguide comprises one or more structures, such as a waveguide core structure (WCS) and a cladding, that confine and guide the propagation of one or more modes associated with optical waves. In general, an optical mode propagating within a waveguide can have a portion of its energy confined within the WCS (e.g., characterized by a material with a higher index of refraction), and a portion of its energy confined within the cladding (e.g., characterized by a material with a lower index of refraction). Thus, the optical mode propagates with an effective index of refraction, $n_{eff}$ that determines the variation of the phase of the optical mode as a function of time and position along the waveguide. The $n_{eff}$ typically has a value that is between the indices of refraction of the WCS and of the cladding.

Waveguides can be fabricated, for example, by forming the WCS from a material having a higher index of refraction surrounded by a cladding comprising one or more materials, or air, that have a lower index of refraction. In other examples, waveguides comprise a WCS located on top of a waveguide slab structure (WSS), where the WCS and WSS can be composed of the same material (e.g., silicon) and are surrounded by a cladding. A portion of the optical wave confined by the waveguide may be traversing through the WSS, such that the material and geometry of the WSS can impact the $n_{eff}$ of the waveguide. Waveguides can also comprise a WCS and one or more auxiliary WCSs located in proximity to the WCS, such that a larger amount of electromagnetic energy of an optical wave propagates within the WCS and a smaller amount of electromagnetic energy of the optical wave propagates within the one or more auxiliary WCSs. Some electromagnetic waves have a spectrum that has a peak wavelength that falls in a particular range of optical wavelengths (e.g., between about 100 nm to about 1 mm, or some subrange thereof), also referred to as optical waves, light waves, or simply light.

A coincidence of two effective indices of refraction occurs when two modes have the same $n_{eff}$. When there is a coincidence in the $n_{eff}$ of two modes supported by a waveguide, any asymmetry in the waveguide can lead to mode hybridization and partial energy exchange between the two modes. In general, asymmetries can be present even in waveguides without any fabrication defects. In some examples, asymmetries can be induced by fabrication defects, such as an asymmetry in the angles of the sidewalls of the waveguide. If asymmetry occurs when there are modes with respective $n_{eff}$ that are equal (i.e., coincident), uncontrolled energy transfer between the two optical modes can occur. Since PICs may be designed for one or more specified modes, any partial energy transfer into adjacent modes or into superpositions of modes can result in undesired loss and potential recombination into the specified modes, thereby causing a parasitic interference pattern in the optical wave.

In general, PICs may have integrated spot size converters (SSCs), which are structures that may be used to optically couple waveguides of the PIC (e.g., composed of relatively small silicon features) with larger external waveguides outside of the PIC (e.g., single mode or polarization maintaining fibers) or to other components (e.g., lasers) that are characterized by a mode size different from that of the waveguide on the PIC that is being coupled to. In some examples, SSCs can be configured to adiabatically transfer an optical wave from a first mode characterized by a first transverse spatial intensity pattern to a second mode characterized by a second transverse spatial intensity pattern different from the first transverse spatial intensity pattern.

In some examples, SSCs that confine modes similar to standard fiber modes can lead to degenerate TE modes and TM modes that are prone to local stress and defects that introduce fluctuations in the optical coupling, especially in harsh temperature and humidity conditions. When coupling an SSC to an external optical fiber, the SSC may be designed to have a $n_{eff}$ at the facet of the PIC that is very similar to the refractive index of the cladding of the external optical fiber. Such a design can make the SSC more sensitive than a standalone waveguide to local defects or stresses that applied to it, which in turn may lead to an undesired polarization rotation of the one or more modes confined by the SSC. One physical mechanism for this sensitivity can be related to the fact that the $n_{eff}$ of the SSC near the facet is similar for TE and TM modes, resulting in degenerate or nearly-degenerate TE and TM modes.

Another problem that can occur in an SSC is if the $n_{eff}$ of a TE mode and the $n_{eff}$ of a TM mode are similar (i.e., coincident or substantially coincident, such as within 10% of one another) and a waveguide with an inverted taper that is part of an SSC has a waveguide cross-section that is squared at one or more locations and some waveguide asymmetry defects are encountered. In such a scenario, uncontrolled modal transfers between the TE modes and the TM modes can occur and may limit performance of the PIC. For example, some SSCs comprise an inverted taper waveguide with a first rectangular cross-section characterized by a first aspect ratio (e.g., 1:2), a square cross-section (i.e., 1:1), and a second rectangular cross-section characterized by a second aspect ratio (e.g., 2:1). Such an aspect ratio inversion can reduce optical coupling losses in the SSC, but decreased polarization control may occur in proximity to the square cross-section.

In general, SSCs can have various embodiments. In some examples, SSCs comprise a first waveguide composed of a first material (e.g., silicon) characterized by a first index of refraction that is evanescently coupled to a second waveguide composed of a second material (e.g., silicon nitride) characterized by a second index of refraction. In other examples, SSCs comprise a waveguide (e.g., comprising silicon) that is evanescently coupled to a multi-rod structure comprising one or more rod structures (e.g., composed of silicon nitride). The multi-rod structure can comprise two or more rod structures that are each configured to guide a portion of an optical wave, such that the multi-rod structure collectively guides one or more modes of an optical wave, where portions of the mode propagate in the vicinity of two or more of the rod structures. If the waveguide and the rod structures are in proximity to one another (e.g., within the transverse spatial intensity pattern of a mode or supermode propagating with the SSC), a transitional supermode can be guided by both the waveguide and the multi-rod structure. A coincidence of the $n_{eff}$ may occur in one or more supermodes of the waveguide and the rod structures in the region of evanescent coupling, possibly resulting in an undesired partial energy transfer between a TE supermode and a TM supermode (e.g., in the presence of asymmetric waveguide sidewalls).

In some SSCs, controlling the waveguide sidewalls during fabrication may be utilized in order to reduce such polarization energy transfer. However, it can be challenging to achieve the amount of control required to fabricate symmetric waveguide sidewalls. Other SSCs may instead be configured to maintain the polarization of the mode confined by the SSC, which may require changes to fabrication processes or the integration of a laser trimming setup on wafer level test stations.

The polarization changing spot size converter (PCSSC) disclosed herein can induce asymmetry with stronger mode hybridization than asymmetries that may be inadvertently present from typical fabrication. In some examples, the stronger induced asymmetry of the PCSSC fully transfers the optical mode from a TM mode to a TE mode, and vice versa (i.e., the PCSSC fully transfers a TE mode to a TM mode). In some examples, the PCSSC controls the integrity of modes confined by the PCSSC against waveguide geometry fabrication degradation by effecting a complete transfer of TE modes to TM modes, and TM modes to TE modes. As used herein, TE and TM modes may also refer to TE-dominated and TM-dominated modes, respectively. For example, relative to a waveguide axis along which the modes propagate, the TE-dominated mode electric field has a greater projection onto a cross-sectional plane normal to the waveguide axis than the TM-mode dominated mode electric field, and the TM-dominated mode magnetic field has a greater projection onto the cross-sectional plane normal to the waveguide axis than the TE-dominated mode magnetic field.

FIG. 1A shows a side cross-sectional view of an example PIC 100A optically coupled to an external optical fiber 101A. The PIC 100A comprises a handle layer 102 (e.g., composed of silicon), a BOX layer 103 (e.g., composed of buried oxide), and an oxide layer 104 (e.g., composed of silicon dioxide). A PCSSC 106A optically couples the external optical fiber 101A and a waveguide 108A (e.g., composed of silicon). The PCSSC 106A comprises a portion of a set of rod structures 110A (e.g., composed of silicon nitride or silicon oxynitride) and a portion of the waveguide 108A that are evanescently coupled over a coupling region (e.g., over the horizontal length of the PCSSC 106A). In some examples, the set of rod structures 110A can comprise multiple WCSs, as in this example, while in other examples the set of rod structures 110A can comprise a single WCS. For visual clarity, additional layers within the oxide layer 104 may have been omitted (e.g., the oxide layer 104 may comprise pre-metal dielectric silicon dioxide deposited on top of the BOX layer 103). Furthermore, the oxide layer 104 surrounding the set of rod structures 110A may have a different density than the oxide layer 104 surrounding the waveguide 108A, thus providing different respective claddings with differing indices of refraction. In general, the waveguide 108A can have a width, along the spatial dimension directed into the page, that tapers (i.e., spatially varies) along the propagation axis of the waveguide 108A. The tapered width results in a spatially varying $n_{eff}$ of the waveguide 108A. The $n_{eff}$ of the waveguide 108A and the $n_{eff}$ of the set of rod structures 110A can thus be designed to be equal (i.e., coincident) in a region where the waveguide 108A and the set of rod structures 110A are evanescently coupled, thus assisting with an adiabatic transfer of an optical wave between the two waveguides.

Figure 1B:
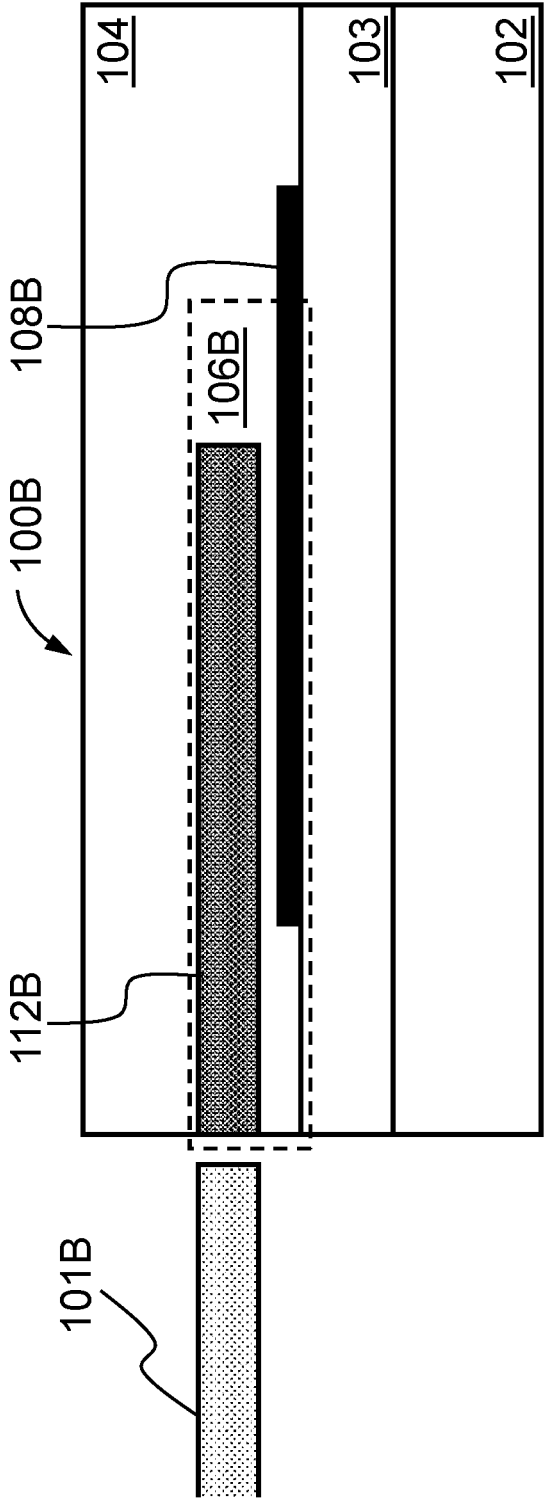
FIG. 1B is a schematic diagram of an example photonic integrated circuit optically coupled to an external optical fiber.

FIG. 1B shows a side cross-sectional view of an example PIC 100B optically coupled to an external optical fiber 101B. The PIC 100B comprises a waveguide 108B characterized by a first index of refraction and an LIOR waveguide 112B (lower index of refraction waveguide), where the LIOR waveguide 112B is characterized by a second index of refraction that is less than the first index of refraction of the waveguide 108B. A PCSSC 106B optically couples the external optical fiber 101B and the waveguide 108B (e.g., composed of silicon). The PCSSC 106B comprises a portion of the LIOR waveguide 112B (e.g., composed of silicon nitride or silicon oxynitride) and a portion of the waveguide 108B that are evanescently coupled over a coupling region (e.g., over the horizontal length of the PCSSC 106B). In general, the waveguide 108B and/or the LIOR waveguide 112B can have respective widths, along the spatial dimension directed into the page, that taper (i.e., spatially vary) along the propagation axis of the waveguide 108B and/or along the propagation axis of the LIOR waveguide 112B. The tapered widths result in a spatially varying $n_{eff}$ of the waveguide 108B and/or a spatially varying $n_{eff}$ of the LIOR waveguide 112B. The $n_{eff}$ of the waveguide 108B and the $n_{eff}$ of the LIOR waveguide 112B can thus be designed to be equal (i.e., coincident) in a region where the waveguide 108B and the LIOR waveguide 112B are evanescently coupled, thus assisting with an adiabatic transfer of an optical wave between the two waveguides.

Figure 1C:
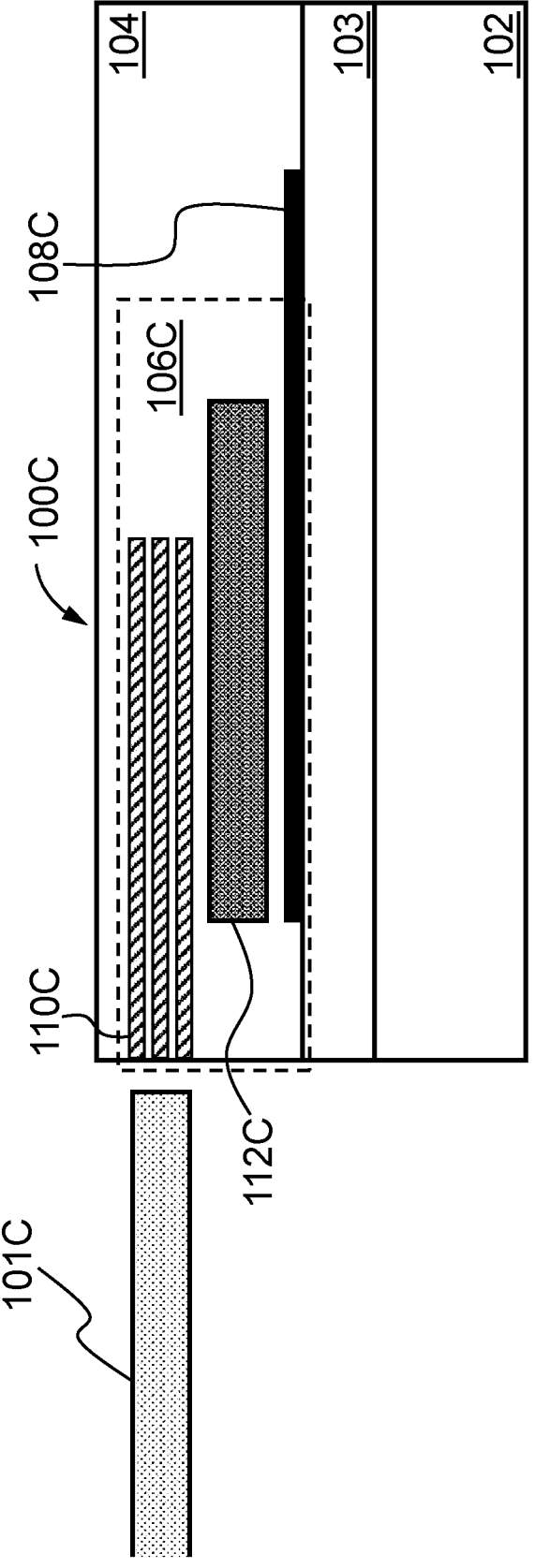
FIG. 1C is a schematic diagram of an example photonic integrated circuit optically coupled to an external optical fiber.

FIG. 1C shows a side cross-sectional view of an example PIC 100C optically coupled to an external optical fiber 101C. The PIC 100C comprises a waveguide 108C characterized by a first index of refraction and an LIOR waveguide 112C (lower index of refraction waveguide), where the LIOR waveguide 112C is characterized by a second index of refraction that is less than the first index of refraction of the waveguide 108C. A PCSSC 106C optically couples the external optical fiber 101C and the waveguide 108C (e.g., composed of silicon). The PCSSC 106C comprises a portion of the LIOR waveguide 112C (e.g., composed of silicon nitride or silicon oxynitride) and a portion of the waveguide 108C that are evanescently coupled over a portion of a coupling region. The PCSSC 106C further comprises a portion of the LIOR waveguide 112C and a portion of a set of rod structures 110C (e.g., composed of silicon nitride or silicon oxynitride) that are evanescently coupled over a portion of the coupling region. In general, the waveguide 108C and/or the LIOR waveguide 112C can have respective widths, along the spatial dimension directed into the page, that taper (i.e., spatially vary) along the propagation axis of the waveguide 108C and/or along the propagation axis of the LIOR waveguide 112C. The tapered widths result in a spatially varying $n_{eff}$ of the waveguide 108C and/or a spatially varying $n_{eff}$ of the LIOR waveguide 112C. The $n_{eff}$ of the waveguide 108C and the $n_{eff}$ of the LIOR waveguide 112C can thus be designed to be equal (i.e., coincident) in a region where the waveguide 108C and the LIOR waveguide 112C are evanescently coupled, thus assisting with an adiabatic transfer of an optical wave between the two waveguides. Additionally, the $n_{eff}$ of the LIOR waveguide 112C and the $n_{eff}$ of the set of rod structures 110C can be designed to be equal (i.e., coincident) in a region where the LIOR waveguide 112C and the set of rod structures 110C are evanescently coupled, thus assisting with an adiabatic transfer of an optical wave between the two waveguides.

Figure 1D:
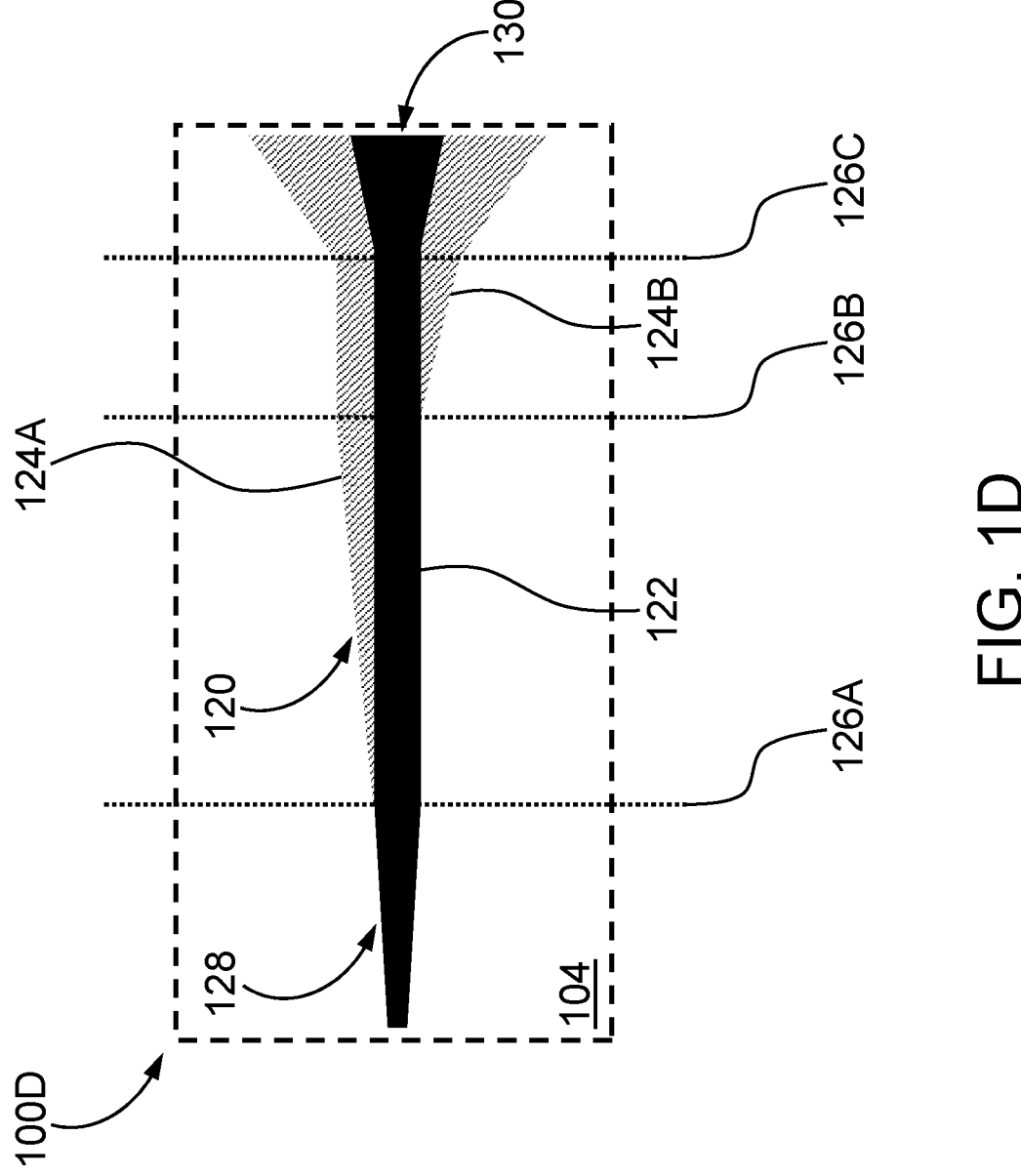
FIG. 1D is a schematic diagram of an example polarization changing spot size converter.

FIG. 1D shows a top cross-sectional view of an example PCSSC 100D. The PCSSC 100D includes a waveguide 120 comprising a WCS 122 (e.g., composed of silicon) and a WSS (e.g., composed of the same material as the WCS 122), where the WSS comprises a first side of the WSS 124A and a second side of the WSS 124B. The PCSSC 100D can evanescently couple the waveguide 120 to a set of rod structures (e.g., as shown in FIG. 1A), a LIOR waveguide (e.g., as shown in FIG. 1B), or a LIOR waveguide that is itself evanescently coupled to a set of rod structures (e.g., as shown in FIG. 1C). A first dotted line 126A, a second dotted line 126B, and a third dotted line 126C denote cross-section (i.e., planes) formed out of the page for FIGS. 1E, 1F, and 1G, respectively.

Figure 1E:
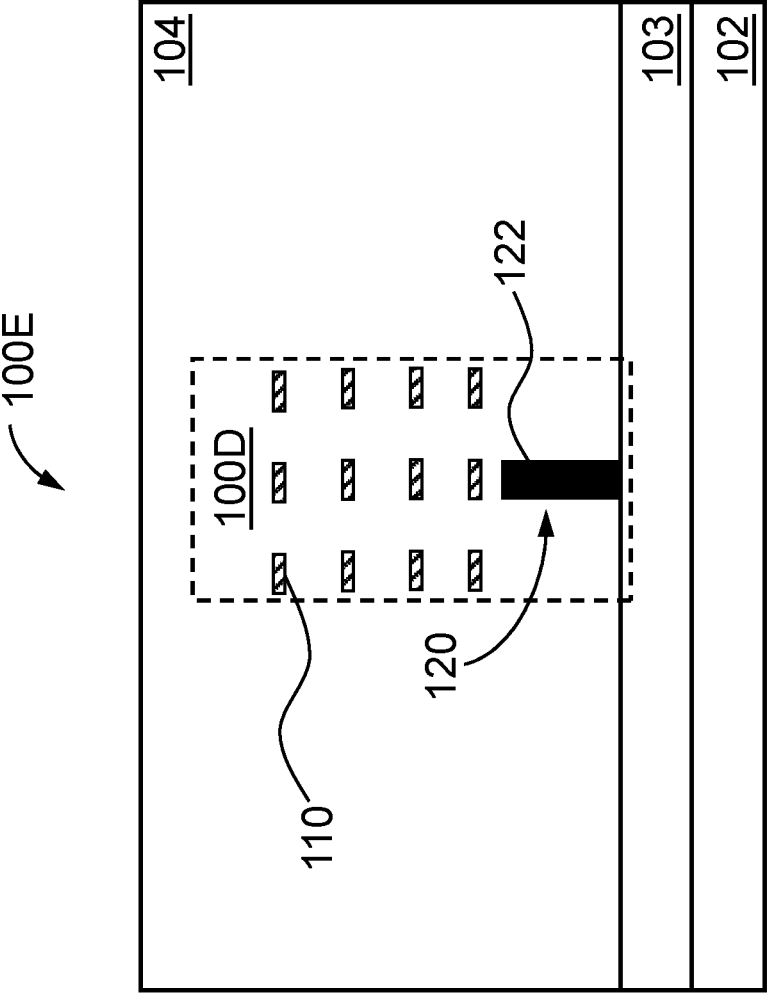
FIG. 1E is a schematic diagram of an example photonic integrated circuit.
Figure 1F:
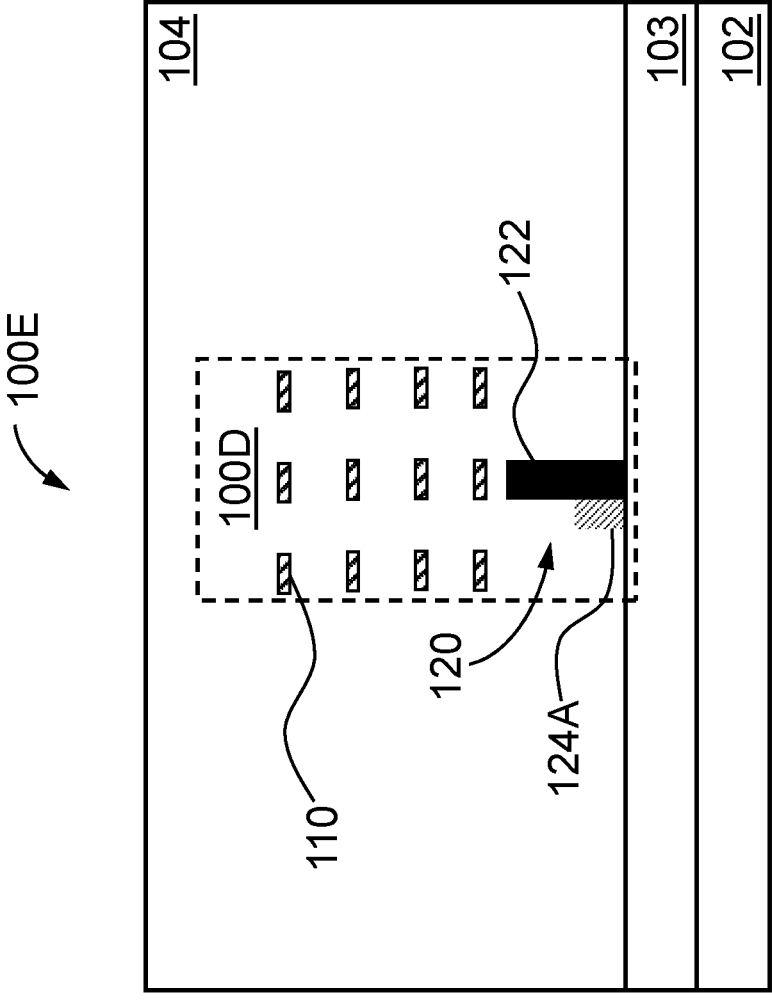
FIG. 1F is a schematic diagram of an example photonic integrated circuit.
Figure 1G:
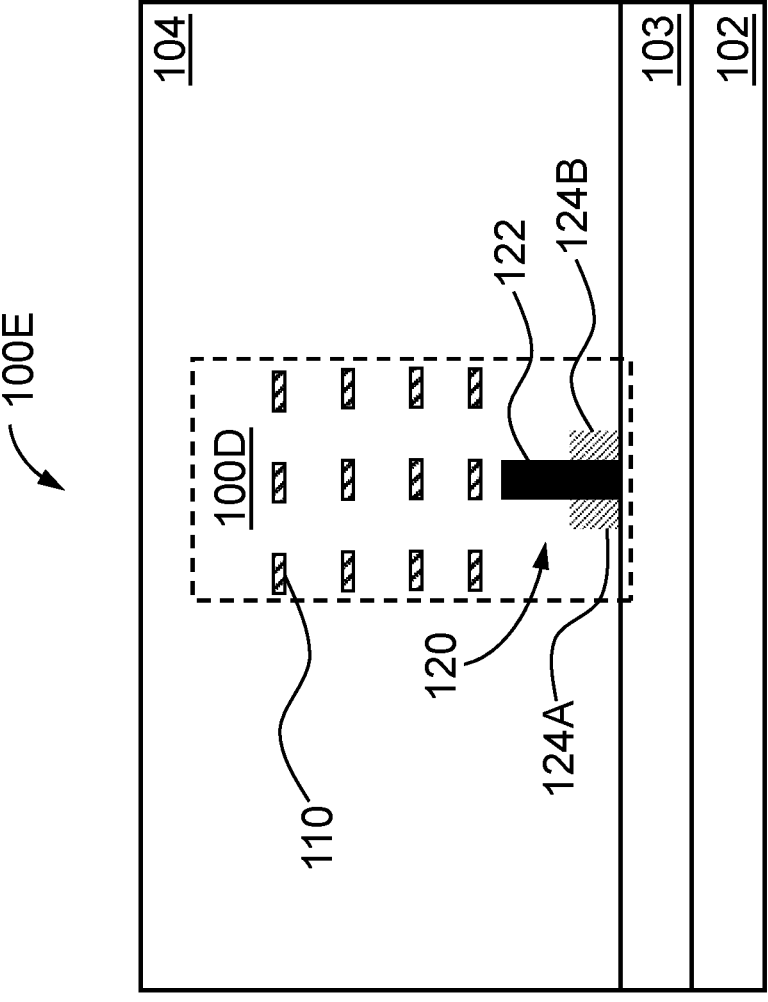
FIG. 1G is a schematic diagram of an example photonic integrated circuit.

Referring again to FIG. 1D, in a first region to the left of the first dotted line 126A, the WCS 122 comprises a first tapered portion 128 with a varying width that modifies the $n_{eff}$ of the waveguide 120, thereby modifying the transverse spatial intensity pattern of one or more modes confined by the waveguide 120 in the first tapered portion 128. By modifying the transverse spatial intensity pattern of one or more modes confined by the waveguide 120, the PCSSC 100D can enhance evanescent coupling between the waveguide 120, which confines modes with smaller transverse spatial intensity patterns, and an optical element that confines modes with larger transverse spatial intensity patterns (e.g., an external optical fiber). In the first region, the width of the left side of the WSS 124A and the width of the right side of the WSS 124B are zero, although a portion of the WSS is located directly underneath the WCS 122 (e.g., as shown in FIGS. 1E, 1F, and 1G).

Referring again to FIG. 1D, in a second region between the first dotted line 126A and the second dotted line 126B, the width of the WCS 122 is constant, the width of the left side of the WSS 124A varies from zero to a first value, and the width of the right side of the WSS 124B is zero. In the second region, the asymmetry of the WSS causes a difference in the $n_{eff}$ of the waveguide 120, thereby changing the mode confined by the PCSSC 100D. Such asymmetry induces mode hybridization that contribute to adiabatic evolution of a TE mode into a TM mode, and adiabatic evolution of a TM mode into a TE mode. In general, the width of the WCS 122 and the width of the right side of the WSS 124B can vary over the second region while still generating polarization rotation of the mode confined by the waveguide 120.

Referring again to FIG. 1D, in a third region between the second dotted line 126B and the third dotted line 126C, the width of the WCS 122 and the width of the left side of the WSS 124A are constant, and the width of the right side of the WSS 124B varies from zero to the first value. In the third region, the asymmetry of the WSS causes a difference in the $n_{eff}$ of the waveguide 120, thereby changing the mode confined by the PCSSC 100D. At the third dotted line 126C, the width of the left side of the WSS 124A and the width of the right side of the WSS 124B are equal. If the mode confined by the waveguide 120 at the first dotted line 126A is a TE mode, then the mode confined by the waveguide 120 at the third dotted line 126C is a TM mode.

Referring again to FIG. 1D, in a fourth region to the right of the third dotted line 126C, the WCS 122 comprises a second tapered portion 130 with a varying width, and the width of the left side of the WSS 124A and the width of the right side of the WSS 124B have equally varying widths that each vary from the first value to a second value larger than the first value. Over the fourth region, the polarization of the mode (e.g., TE or TM) can be unchanged from the polarization of the mode at the third dotted line 126C, while the increasing width of the WCS 122, the left side of the WSS 124A, and the right side of the WSS 124B result in the mode being characterized by a smaller transverse spatial intensity pattern (e.g., such that the mode can have higher modal overlap with a silicon waveguide that is optically coupled to the PCSSC 100D).

Referring again to FIG. 1D, the linearly increasing widths shown in this example (e.g., the linearly increasing width, as a function of distance, of the left side of the WSS 124A over the second region) can, in general, be non-linear or piece-wise linear. For example, the left side of the WSS 124A over the second region may be curved (e.g., quadratically increasing width as a function of distance).

Referring again to FIG. 1D, in this example, the waveguide 120 is a tapered slab waveguide (i.e., comprising a WCS 122, the left side of the WSS 124A, and the right side of the WSS 124B) instead of a tapered strip waveguide (i.e., comprising only the WCS 122). In some examples, the modes confined by a slab waveguide can be substantially more robust to sidewall roughness of the waveguide 120 when compared to the modes confined by a strip waveguide. The robustness of the waveguide 120 (i.e., a slab waveguide) can substantially reduce the optical return loss (ORL) of the PCSSC 100D.

FIG. 1E shows a cross-sectional view, through a plane denoted by the first dotted line 126A of FIG. 1D, of a PCSSC 100D in an example PIC 100E. The PCSSC 100D comprises a waveguide 120 located underneath a set of rod structures

110. The waveguide 120 comprises a WCS 122 with a WSS that has zero width and is composed of the same material of the WCS 122, such that the WSS is located directly underneath the WCS 122 and does not extend beyond the edges of the WCS 122.

FIG. 1F shows a cross-sectional view, through a plane denoted by the second dotted line 126B of FIG. 1D, of the PCSSC 100D in the example PIC 100E. In this plane, the PCSSC 100D also comprises the waveguide 120 located underneath the set of rod structures 110. But, in this plane, the waveguide 120 comprises the WCS 122 with a WSS that has nonzero width on one side, such that a left side of the WSS 124A extends beyond an edge of the WCS 122. In general, the left side of the WSS 124A can be composed of the same material (e.g., silicon) as the WCS 122.

FIG. 1G shows a cross-sectional view, through a plane denoted by the third dotted line 126C of FIG. 1D, of a PCSSC 100D in the example PIC 100E. In this plane, the PCSSC 100D also comprises the waveguide 120 located underneath the set of rod structures 110. But, in this plane, the waveguide 120 comprises the WCS 122 with a WSS that has nonzero width on both sides, such that a left side of the WSS 124A and a right side of the WSS 124B extend beyond the edges of the WCS 122. In general, the left side of the WSS 124A and the right side of the WSS 124B can be composed of the same material (e.g., silicon) as the WCS 122.

Any of a variety of other types of waveguide configurations can be used to form other examples of PCSSCs that are able to provide a similar full TE to TM and TM to TE mode coupling that leads to controlled polarization rotation. FIGS. 2A, 2B, 2C, and 2D show cross-sectional views of example waveguides that comprise a WCS and one or more auxiliary WCSs located in proximity to the WCS (e.g., such that a mode confined by the waveguides has a transverse spatial intensity pattern that extends between the WCS and the auxiliary WCSs, as well as inside of the one or more auxiliary WCSs), where the WCS and the auxiliary WCSs are characterized by the same index of refraction.

Figures 2A, 2B, 2C, 2D:
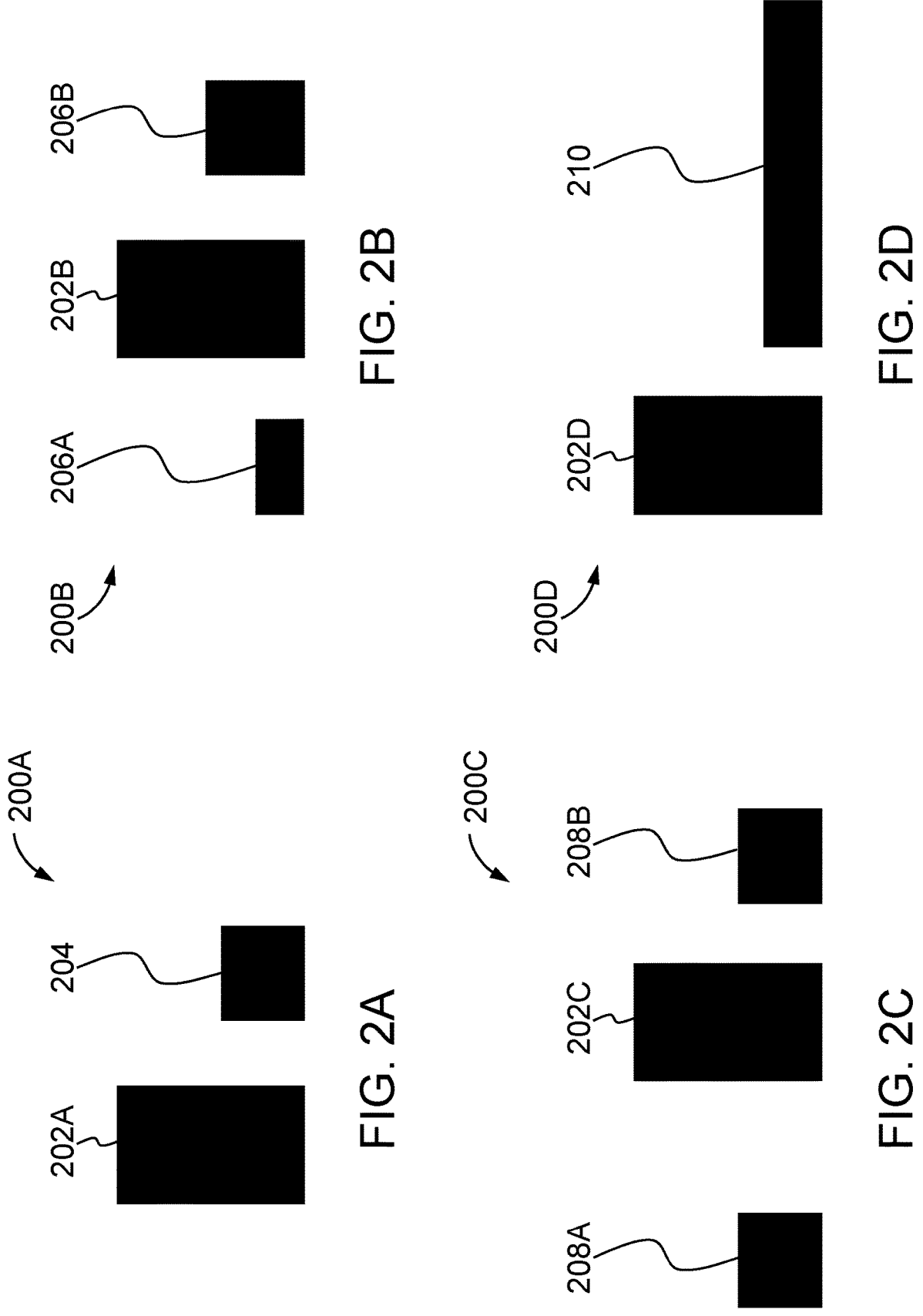
FIGS. 2A, 2B, 2C, and 2D are schematic diagrams of cross-sectional views of example waveguides.

FIG. 2A shows a cross-sectional view of an example waveguide 200A comprising a WCS 202A and an auxiliary WCS 204, each composed of the same material (e.g., silicon). An optical wave can have a larger amount of its electromagnetic energy within the WCS 202A and a smaller amount of its electromagnetic energy within the auxiliary WCS 204. The presence of the auxiliary WCS 204 on only one side of the WCS 202A introduces an asymmetry to the waveguide 200A such that polarization rotation can occur for an optical mode confined by the waveguide 200A.

FIG. 2B shows a cross-sectional view of an example waveguide 200B comprising a WCS 202B, a first auxiliary WCS 206A, and a second auxiliary WCS 206B, each composed of the same material. An optical wave can have a larger amount of its electromagnetic energy within the WCS 202B and a smaller amount of its electromagnetic energy within the first auxiliary WCS 206A and the second auxiliary WCS 206B. The difference in height between the first auxiliary WCS 206A and the second auxiliary WCS 206B introduces an asymmetry to the waveguide 200B such that polarization rotation can occur for an optical mode confined by the waveguide 200B.

FIG. 2C shows a cross-sectional view of an example waveguide 200C comprising a WCS 202C, a first auxiliary WCS 208A, and a second auxiliary WCS 208B, each composed of the same material. An optical wave can have a larger amount of its electromagnetic energy within the WCS 202C and a smaller amount of its electromagnetic energy within the first auxiliary WCS 208A and the second auxiliary WCS 208B. The first auxiliary WCS 208A and the second auxiliary WCS 208B are separated by different amounts from the WCS 202C, thereby introducing an asymmetry to the waveguide 200C such that polarization rotation can occur for an optical mode confined by the waveguide 200C.

FIG. 2D shows a cross-sectional view of an example waveguide 200D comprising a WCS 202D and an auxiliary WCS 210, each composed of the same material. An optical wave can have a larger amount of its electromagnetic energy within the WCS 202D and a smaller amount of its electromagnetic energy within the auxiliary WCS 210. The presence of the auxiliary WCS 210 on only one side of the WCS 202D introduces an asymmetry to the waveguide 200D such that polarization rotation can occur for an optical mode confined by the waveguide 200D.

FIGS. 3A, 3B, 3C, and 3D show cross-sectional views of example waveguides that include a waveguide structure comprising a WCS located on top of a WSS, and one or more auxiliary WCSs located in proximity to the waveguide structure (e.g., such that a mode confined by the waveguide structure has a transverse spatial intensity pattern that extends into the one or more auxiliary WCSs), where the waveguide structure and the auxiliary WCSs are characterized by different indices of refraction, and the WCS and the WSS forming the waveguide structure are composed of the same material. In some examples, the auxiliary WCSs can be formed by applying laser light to a portion of cladding surrounding the WCS so as to modify the index of refraction over a specified area. In other examples, the auxiliary WCSs can be formed by depositing a material that is different from the material of the WCS.

Figures 3A, 3B, 3C, 3D:
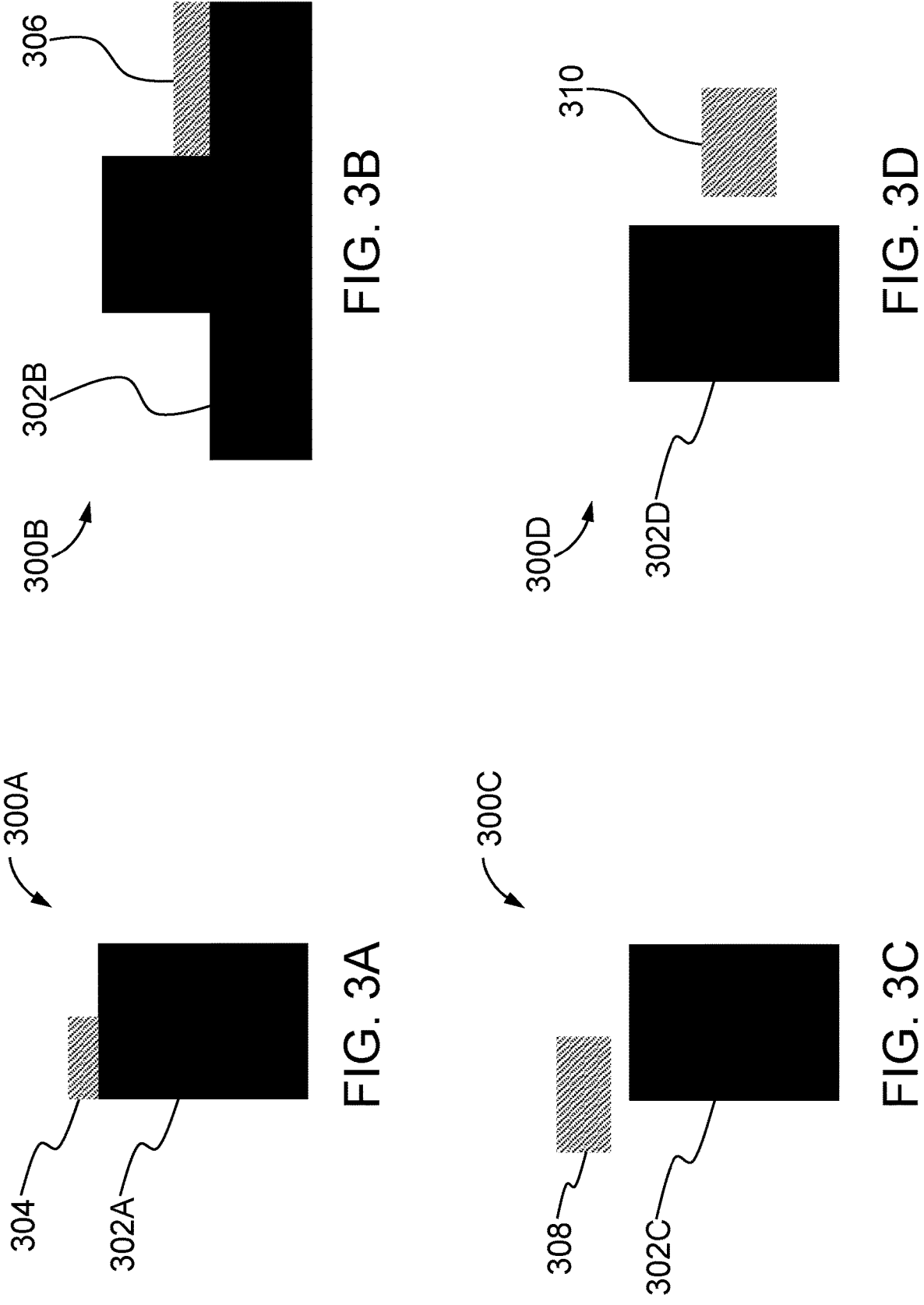
FIGS. 3A, 3B, 3C, and 3D are schematic diagrams of cross-sectional views of example waveguides.

FIG. 3A shows a cross-sectional view of an example waveguide 300A comprising a waveguide structure 302A and an auxiliary WCS 304 located on top of the waveguide structure 302A, each characterized by different respective indices of refraction. An optical wave can have a larger amount of its electromagnetic energy within the waveguide structure 302A and a smaller amount of its electromagnetic energy within the auxiliary WCS 304. The horizontal offset of the auxiliary WCS 304 from the center of the waveguide structure 302A introduces an asymmetry to the waveguide 300A such that polarization rotation can occur for an optical mode confined by the waveguide 300A.

FIG. 3B shows a cross-sectional view of an example waveguide 300B comprising a waveguide structure 302B and an auxiliary WCS 306 located on top of a portion of the waveguide structure 302B, each characterized by different respective indices of refraction. An optical wave can have a larger amount of its electromagnetic energy within the waveguide structure 302B and a smaller amount of its electromagnetic energy within the auxiliary WCS 306. The presence of the auxiliary WCS 306 on only one side of the waveguide structure 302B introduces an asymmetry to the waveguide 300B such that polarization rotation can occur for an optical mode confined by the waveguide 300B.

FIG. 3C shows a cross-sectional view of an example waveguide 300C comprising a waveguide structure 302C and an auxiliary WCS 308 located above the waveguide structure 302C, each characterized by different respective indices of refraction. An optical wave can have a larger amount of its electromagnetic energy within the waveguide structure 302C and a smaller amount of its electromagnetic energy within the auxiliary WCS 308. The horizontal offset of the auxiliary WCS 308 from the center of the waveguide structure 302C introduces an asymmetry to the waveguide

300C such that polarization rotation can occur for an optical mode confined by the waveguide 300C.

FIG. 3D shows a cross-sectional view of an example waveguide 300D comprising a waveguide structure 302D and an auxiliary WCS 310 located to the right of the waveguide structure 302D, each characterized by different respective indices of refraction. An optical wave can have a larger amount of its electromagnetic energy within the waveguide structure 302D and a smaller amount of its electromagnetic energy within the auxiliary WCS 310. The presence of the auxiliary WCS 310 on only one side of the waveguide structure 302D introduces an asymmetry to the waveguide 300D such that polarization rotation can occur for an optical mode confined by the waveguide 300D.

FIGS. 4A, 4B, 4C, and 4D show cross-sectional views of example waveguides each comprising a waveguide structure. The waveguide structures comprise a WCS located on top of a WSS, where the WCS and the WSS are composed of the same material.

Figures 4A, 4B, 4C, 4D:
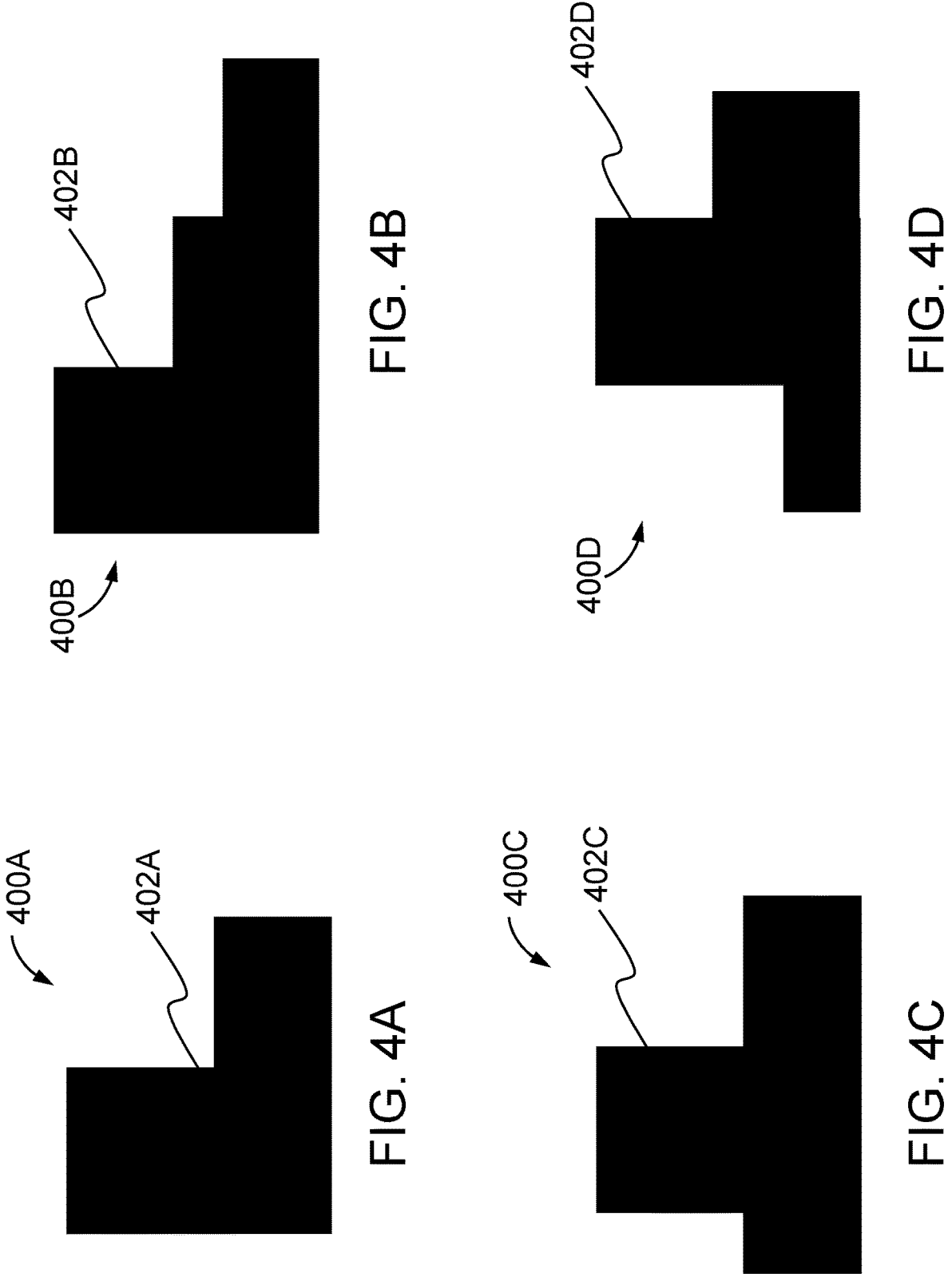
FIGS. 4A, 4B, 4C, and 4D are schematic diagrams of cross-sectional views of example waveguides.

FIG. 4A shows a cross-sectional view of an example waveguide 400A comprising a waveguide structure 402A. In this example, a right side of a WSS extends beyond the right edge of a WCS and a left side of the WSS does not extend beyond the left edge of the WCS, thereby introducing an asymmetry to the waveguide 400A such that polarization rotation can occur for an optical mode confined by the waveguide 400A.

FIG. 4B shows a cross-sectional view of an example waveguide 400B comprising a waveguide structure 402B. In this example, a right side of a WSS extends beyond the right edge of a WCS and a left side of the WSS does not extend beyond the left edge of the WCS, thereby introducing an asymmetry to the waveguide 400B such that polarization rotation can occur for an optical mode confined by the waveguide 400B. The right side of the WSS comprises a first portion of a first height and a second portion of a second height different from the first height.

FIG. 4C shows a cross-sectional view of an example waveguide 400C comprising a waveguide structure 402C. In this example, a right side of a WSS is wider than a left side of the WSS, thereby introducing an asymmetry to the waveguide 400C such that polarization rotation can occur for an optical mode confined by the waveguide 400C.

FIG. 4D shows a cross-sectional view of an example waveguide 400D comprising a waveguide structure 402D. In this example, a right side of a WSS is the same width as the left side of the WSS and has a height that is greater than the left side of the WSS, thereby introducing an asymmetry to the waveguide 400D such that polarization rotation can occur for an optical mode confined by the waveguide 400D.

Figure 5B:
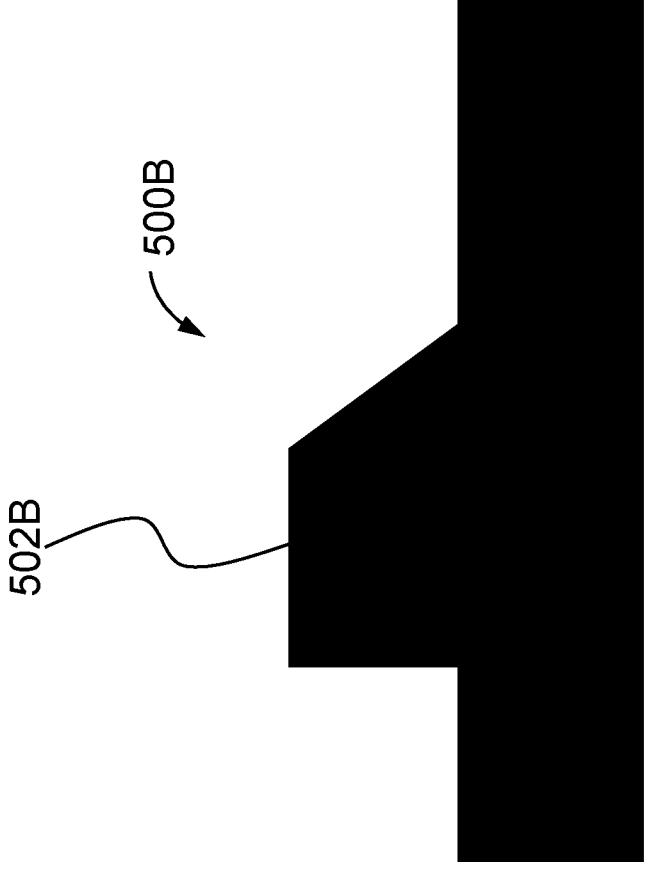
FIGS. 5A and 5B are schematic diagrams of cross-sectional views of example waveguides.
Figure 5A:
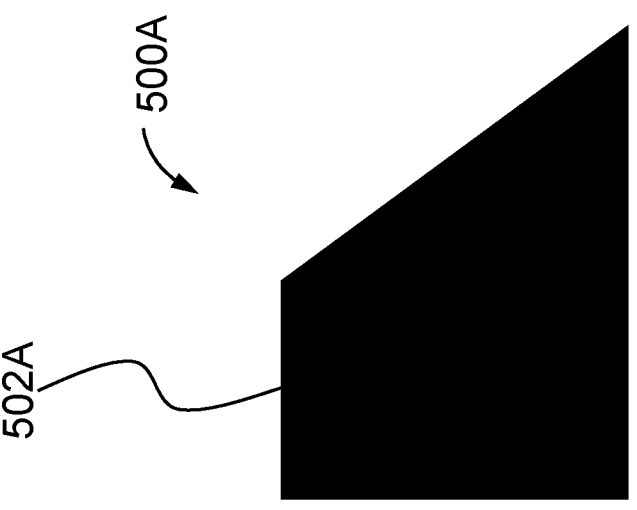

FIG. 5A shows a cross-sectional view of an example waveguide 500A comprising a waveguide structure 502A. In this example, a right side of a WCS has a spatially varying height that decreases from left to right, thereby introducing an asymmetry to the waveguide 500A such that polarization rotation can occur for an optical mode confined by the waveguide 500A.

FIG. 5B shows a cross-sectional view of an example waveguide 500B comprising a waveguide structure 502B. In this example, a right side of a WSS is wider than a left side of the WSS and a right side of the WCS has a spatially varying height that decreases from left to right, thereby introducing an asymmetry to the waveguide 500B such that polarization rotation can occur for an optical mode confined by the waveguide 500B.

In general, the $n_{eff}$ of an optical mode guided by a waveguide depends on the index of refraction of each structure forming the waveguide (e.g., a WCS and a WSS) and the overlap of the spatial intensity distribution of the optical mode with each structure. Thus, the spatial intensity distribution of the optical mode, the geometrical shape and orientation of each structure of the waveguide, as well as gaps in the structures of the waveguide (e.g., a subwavelength grating (SWG) of gaps, as shown in FIG. 6A) can modify the $n_{eff}$ of the optical mode by changing the overlap of its spatial intensity distribution with each structure.

Figures 6A, 6B:
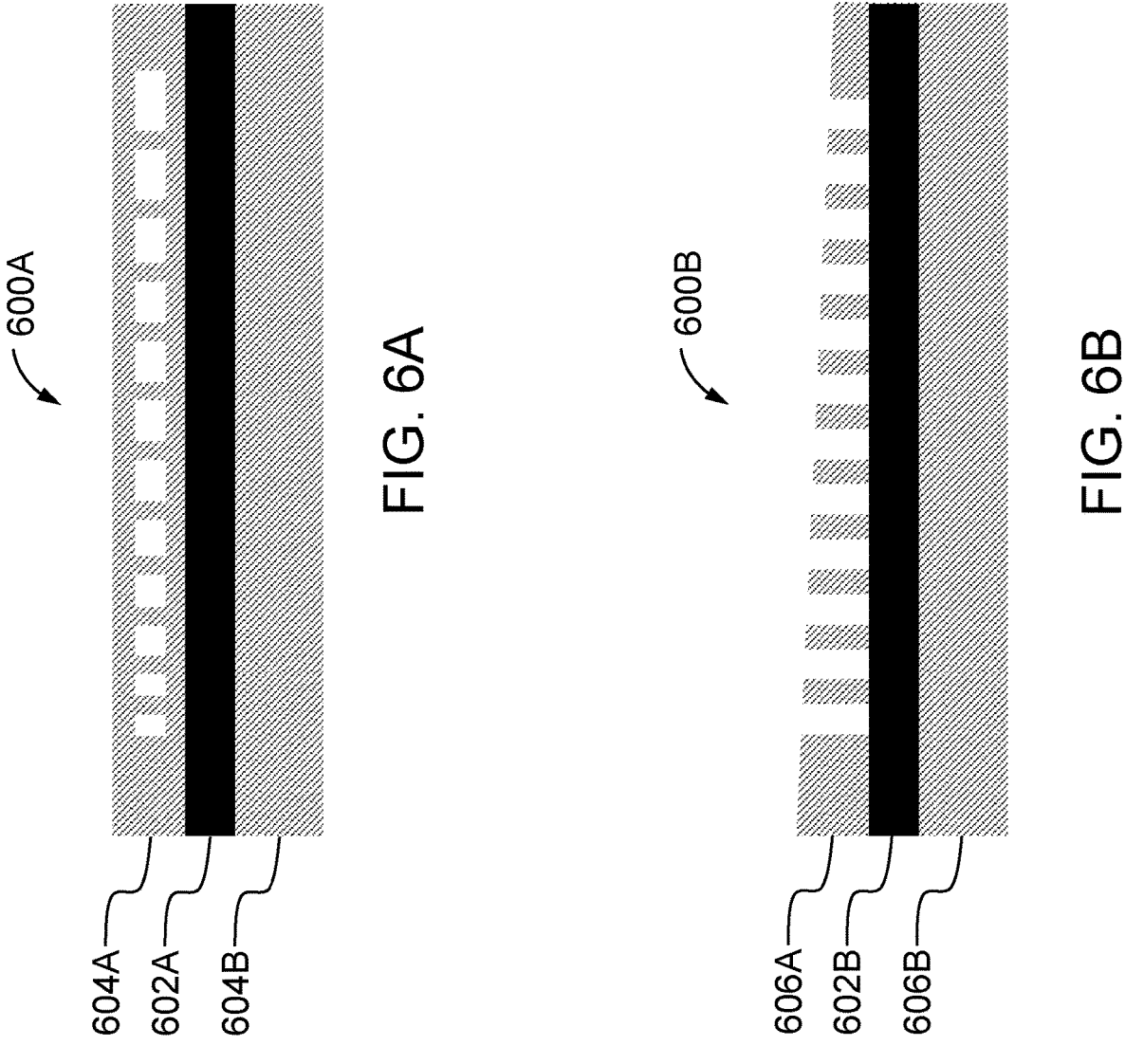
FIGS. 6A, 6B, 6C, 6D, 6E, and 6F are schematic diagrams of top views of example waveguides.

FIG. 6A shows a top view of an example waveguide 600A comprising a WCS 602A and a WSS, where the WSS comprises a right side of the WSS 604B and a left side of the WSS 604A that comprises a SWG of gaps in the WSS (i.e., the grating spacing of the gaps is smaller than the wavelength of the light confined by the waveguide 600A). The SWG of gaps spatially vary in gap size (i.e., volume) along the propagation axis of the waveguide 600A, thereby introducing an asymmetry to the waveguide 600A such that polarization rotation can occur for an optical mode confined by the waveguide 600A.

FIG. 6B shows a top view of an example waveguide 600B comprising a WCS 602B and a WSS, where the WSS comprises a left side of the WSS 606A that spatially varies in width and a right side of the WSS 606B, thereby introducing an asymmetry to the waveguide 600B such that polarization rotation can occur for an optical mode confined by the waveguide 600B. In this example, the left side of the WSS 606A comprises a SWG of gaps in the WSS that do not spatially vary in gap size.

Figures 6C, 6D:
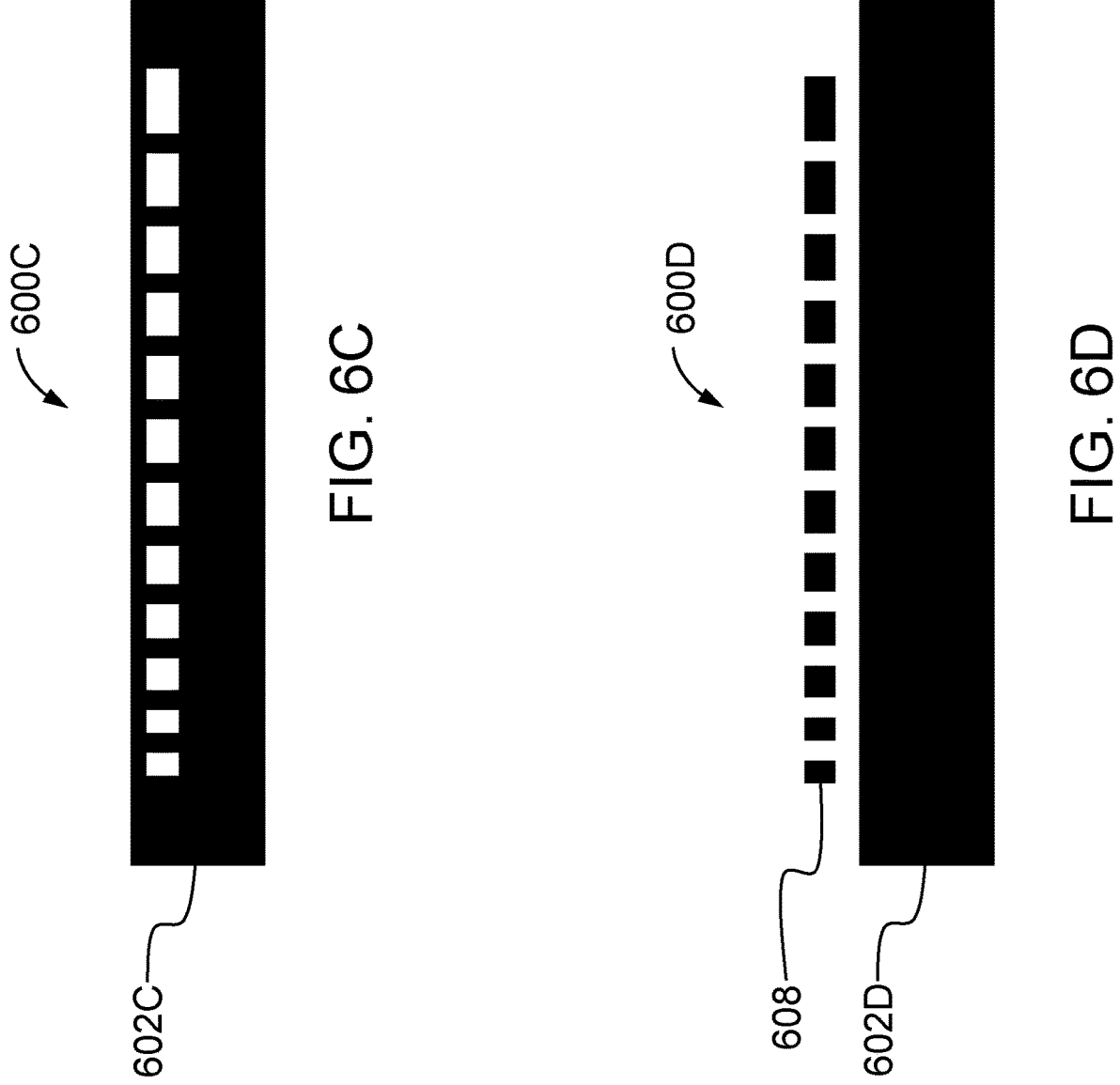

FIG. 6C shows a top view of an example waveguide 600C comprising a WCS 602C, where the left side of the WCS 602C comprises a SWG of gaps that spatially vary in gap size along the propagation axis of the waveguide 600C, thereby introducing an asymmetry to the waveguide 600C such that polarization rotation can occur for an optical mode confined by the waveguide 600C.

FIG. 6D shows a top view of an example waveguide 600D comprising a WCS 602D and auxiliary WCSs 608 of varying sizes arranged as a SWG on the left side of the WCS 602D, thereby introducing an asymmetry to the waveguide 600D such that polarization rotation can occur for an optical mode confined by the waveguide 600D.

Figures 6E, 6F:
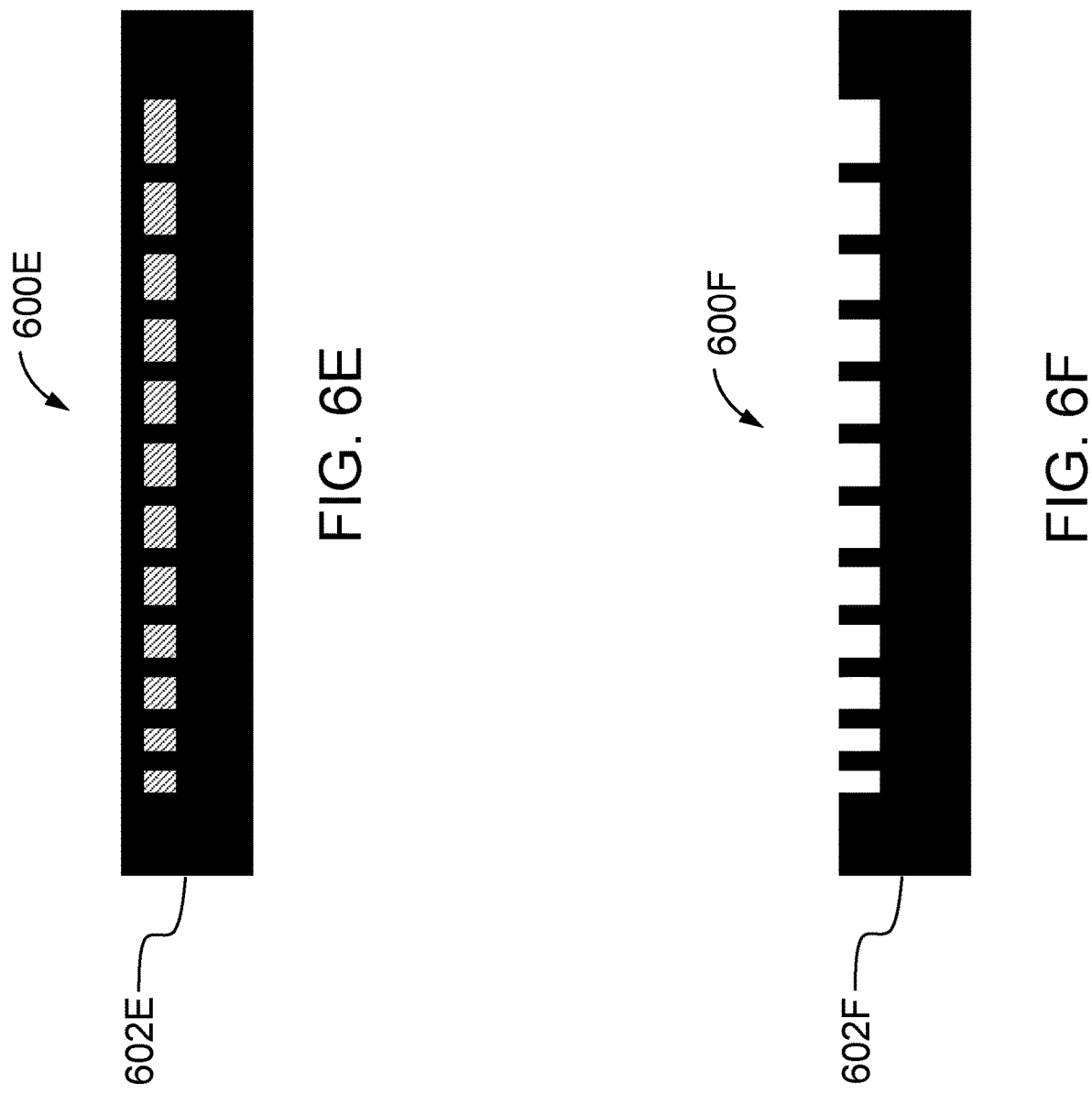

FIG. 6E shows a top view of an example waveguide 600E comprising a WCS 602E, where the left side of the WCS 602E comprises a SWG of gaps in the WCS 602E that spatially vary in gap size along the propagation axis of the waveguide 600E and that are filled with a material characterized by an index of refraction that is different than the index of refraction of the material of the WCS 602E, thereby introducing an asymmetry to the waveguide 600E such that polarization rotation can occur for an optical mode confined by the waveguide 600E.

FIG. 6F shows a top view of an example waveguide 600F comprising a WCS 602F, where the left side of the WCS 602F comprises a SWG of gaps in the WCS 602F that spatially vary in gap size along the propagation axis of the waveguide 600F, thereby introducing an asymmetry to the waveguide 600F such that polarization rotation can occur for an optical mode confined by the waveguide 600F.

Figures 7A, 7B:
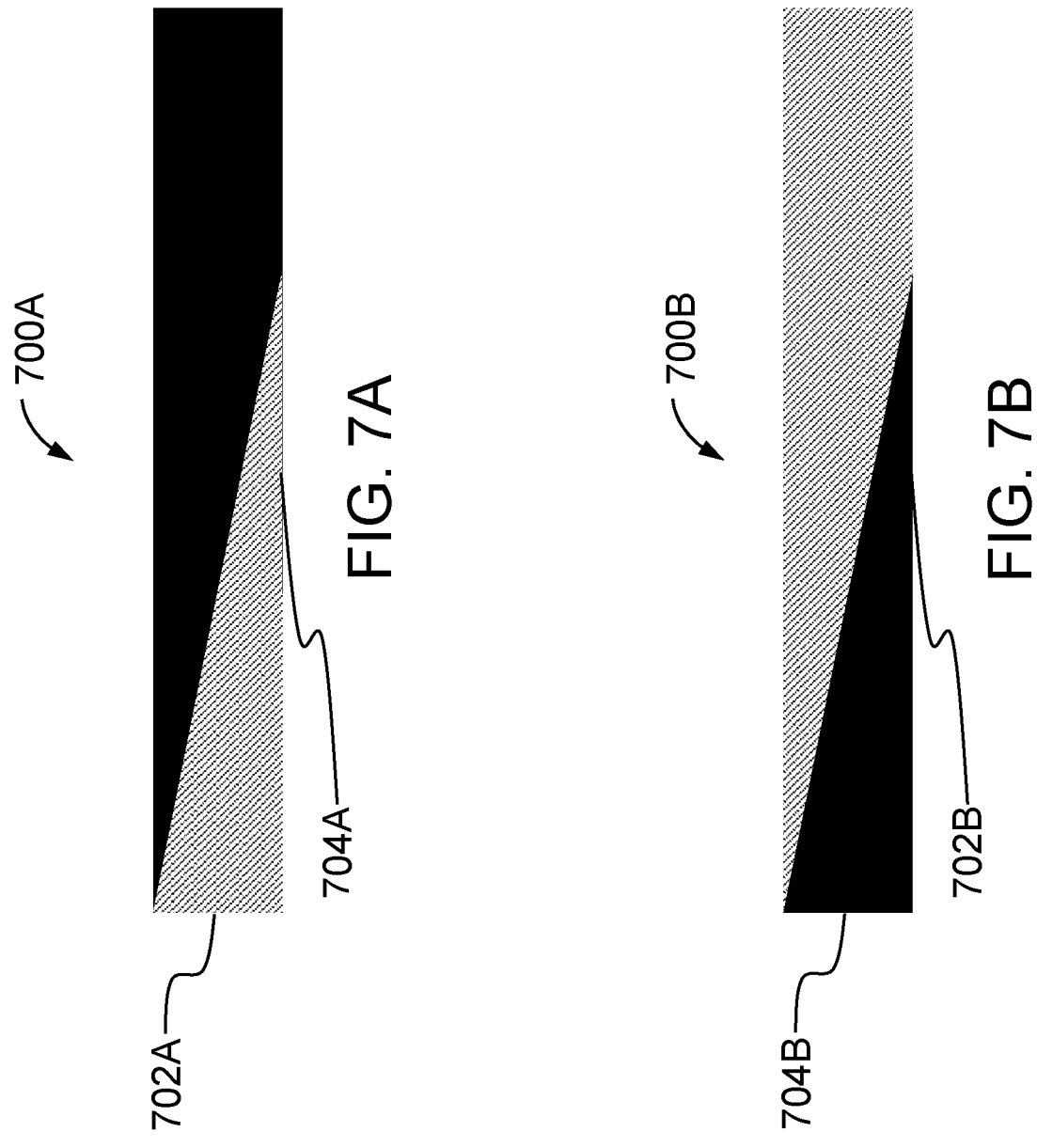
FIGS. 7A and 7B are schematic diagrams of top views of example waveguides.

FIG. 7A shows a top view of an example waveguide 700A comprising a WCS 702A and a WSS 704A, each with widths that spatially vary, thereby introducing an asymmetry to the waveguide 700A such that polarization rotation can occur for an optical mode confined by the waveguide 700A.

FIG. 7B shows a top view of an example waveguide 700B comprising a WCS 702B and a WSS 704B, each with widths that spatially vary, thereby introducing an asymmetry to the waveguide 700B such that polarization rotation can occur for an optical mode confined by the waveguide 700A.

Figure 8:
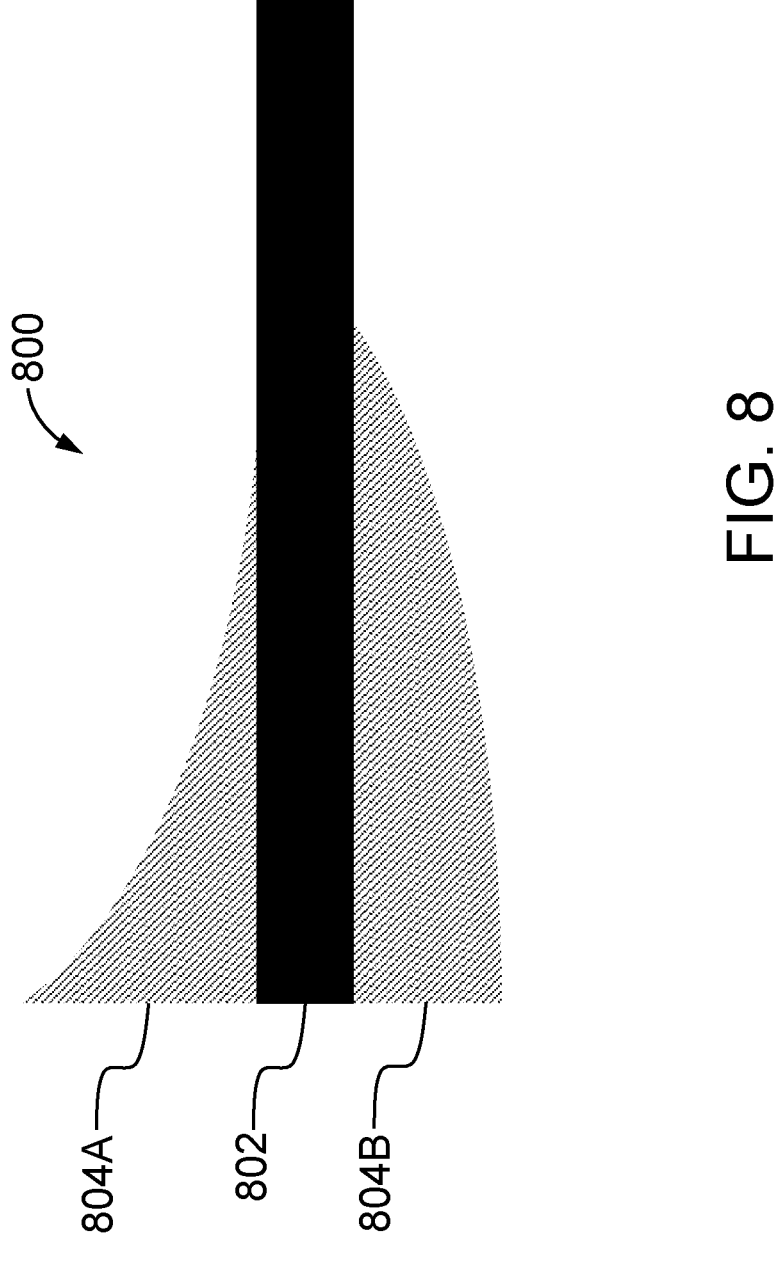
FIG. 8 is a schematic diagram of a top view of an example waveguide.

FIG. 8 shows a top view of an example waveguide 800 comprising a WCS 802 and a WSS, where the WSS comprises a left side of the WSS 804A and a right side of the WSS 804B. The left side of the WSS 804A and the right side of the WSS 804B each have widths that spatially vary non-linearly (i.e., widths that are curved) and that are unequal to each other for at least a portion of the waveguide 800, thereby introducing an asymmetry to the waveguide 800 such that polarization rotation can occur for an optical mode confined by the waveguide 800.

In some applications, the PCSSC may be utilized to couple light from an input laser (e.g., at a local oscillator (LO) port), where uncontrolled polarization rotation can have a substantial negative impact. For example, the polarization maintaining ferrule assembly of an external optical fiber that is carrying a laser input can be oriented to launch a TM mode at the die facet of a PIC so as to provide a TE mode at the opposite end of the PCSSC. Other ports (e.g., signal and transmit ports) may also utilize the PCSSC, but may be less impacted by uncontrolled polarization rotation since mode orthogonality, not polarization rotation, can substantially impact such ports. The PCSSC may also be utilized in semiconductor optical amplifier (SOA) designs. For example, the SOA may operate in a TE mode and a complete transfer from a TM mode to a TE mode may be produced by the PCSSC so as to limit excess loss.

As summarized above, in one aspect, in general, an article of manufacture comprises: a first waveguide configured to confine, over a first region, a first optical wave to a first mode and a second optical wave to a second mode, where the first mode is characterized by a first polarization of an electric field, and the second mode is characterized by a second polarization of an electric field perpendicular to the first polarization; and a second waveguide configured to confine, over a second region, the first optical wave to a third mode and the second optical wave to a fourth mode, where the third mode is characterized by a third polarization of an electric field perpendicular to the first polarization, and the fourth mode is characterized by a fourth polarization of an electric field perpendicular to the second polarization; where a portion of the first waveguide and a portion of the second waveguide are located in proximity to each other over a coupling region and are configured to (1) evanescently couple the first optical wave from the first mode to the third mode over the coupling region and (2) evanescently couple the second optical wave from the second mode to the fourth mode over the coupling region.

As summarized above, in another aspect, in general, a method comprises: receiving, into a first waveguide, a first optical wave and a second optical wave; confining, with the first waveguide, the first optical wave to a first mode and the second optical wave to a second mode over a first region, where the first mode is characterized by a first polarization of an electric field, and the second mode is characterized by a second polarization of an electric field perpendicular to the first polarization; confining, with the second waveguide, the first optical wave to a third mode and the second optical wave to a fourth mode over a second region, where the third mode is characterized by a third polarization of an electric field perpendicular to the first polarization, and the fourth mode is characterized by a fourth polarization of an electric field perpendicular to the second polarization; and evanescently coupling, over a coupling region, (1) the first optical wave from the first mode to the third mode and (2) the second optical wave from the second mode to the fourth mode.

As summarized above, in another aspect, in general, a method comprises: receiving a first optical wave into a first waveguide that confines the first optical wave to a first mode over a first portion of a coupling region; evanescently coupling the first optical wave, over the coupling region, from the first mode to a second mode confined by a second waveguide; and over at least a portion of the coupling region, rotating a polarization of an electric field of the first optical wave by approximately 90 degrees independently from an initial direction of polarization of the electric field of the first optical wave when received into the first waveguide.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An article of manufacture comprising:
a first waveguide configured to confine, over a first region, a first optical wave to a first mode and a second optical wave to a second mode, where the first mode is characterized by a first polarization of an electric field, and the second mode is characterized by a second polarization of an electric field perpendicular to the first polarization; and
a second waveguide configured to confine, over a second region, the first optical wave to a third mode and the second optical wave to a fourth mode, where the third mode is characterized by a third polarization of an electric field perpendicular to the first polarization, and the fourth mode is characterized by a fourth polarization of an electric field perpendicular to the second polarization;
where a portion of the first waveguide and a portion of the second waveguide are located in proximity to each other over a coupling region and are configured to (1) evanescently couple the first optical wave from the first mode to the third mode over the coupling region and (2) evanescently couple the second optical wave from the second mode to the fourth mode over the coupling region; and
where the first waveguide comprises a waveguide core structure located on top of a waveguide slab structure, and at least one of a width of the waveguide core structure or a width of the waveguide slab structure spatially varies.

2. The article of manufacture of claim 1, where the second waveguide is optically coupled to an optical fiber.

3. The article of manufacture of claim 1, where the second waveguide comprises silicon nitride or silicon oxynitride, and the first waveguide comprises silicon.

4. The article of manufacture of claim 1, where the second waveguide comprises two or more rod structures.

5. The article of manufacture of claim 1, further comprising a third waveguide, where a portion of the first waveguide, a portion of the second waveguide, and a portion of the third waveguide are located in proximity to each other over the coupling region, and the third waveguide is located between the first waveguide and the second waveguide.

6. The article of manufacture of claim 1, where at least a portion of the waveguide slab structure is characterized by a first width on a first side of the waveguide core structure and a second width on a second side of the waveguide core structure, and the first width is different from the second width.

7. The article of manufacture of claim 1, where at least a portion of the waveguide slab structure is characterized by a first height on a first side of the waveguide core structure and a second height on a second side of the waveguide core structure, and the first height is different from the second height.

8. The article of manufacture of claim 1, where at least a portion of the waveguide slab structure is characterized by a first index of refraction on a first side of the waveguide core structure and a second index of refraction on a second side of the waveguide core structure, and the first index of refraction is different from the second index of refraction.

9. The article of manufacture of claim 1, where at least a portion of the first waveguide is characterized by a first index of refraction on a first side of the first waveguide and a second index of refraction on a second side of the first waveguide, and the first index of refraction is different from the second index of refraction.

10. The article of manufacture of claim 1, where the first waveguide comprises a waveguide core structure and one or more auxiliary waveguide core structures, and the auxiliary waveguide core structures are arranged asymmetrically with respect to the waveguide core structure.

11. The article of manufacture of claim 1, where a diameter of the first mode and a diameter of the second mode are each smaller than a diameter of the third mode and a diameter of the fourth mode by a factor of at least two.

12. The article of manufacture of claim 1, where over at least a portion of the coupling region, the first waveguide and second waveguide are configured to rotate a polarization of an electric field of the first optical wave by approximately 90 degrees independently from an initial direction of polarization of the electric field of the first optical wave when received into the first waveguide.

13. The article of manufacture of claim 1, where a portion of the first waveguide and a portion of the second waveguide are located in proximity to each other over the coupling region and are separated by a distance less than respective transverse spatial intensity patterns associated with the first mode, the second mode, the third mode, and the fourth mode.

14. A method comprising:
receiving, into a first waveguide, a first optical wave and a second optical wave;
confining, with the first waveguide, the first optical wave to a first mode and the second optical wave to a second mode over a first region, where the first mode is characterized by a first polarization of an electric field, and the second mode is characterized by a second polarization of an electric field perpendicular to the first polarization;
confining, with the second waveguide, the first optical wave to a third mode and the second optical wave to a fourth mode over a second region, where the third mode is characterized by a third polarization of an electric field perpendicular to the first polarization, and the fourth mode is characterized by a fourth polarization of an electric field perpendicular to the second polarization; and evanescently coupling, over a coupling region, (1) the first optical wave from the first mode to the third mode and (2) the second optical wave from the second mode to the fourth mode;

where a diameter of the first mode and a diameter of the third mode differ by at least a factor of two, and a diameter of the second mode and a diameter of the fourth mode differ by at least a factor of two.

15. The method of claim 14, where a portion of the first waveguide and a portion of the second waveguide are located in proximity to each other over the coupling region and are separated by a distance less than respective transverse spatial intensity patterns associated with the first mode, the second mode, the third mode, and the fourth mode.

16. A method comprising:

receiving a first optical wave into a first waveguide that confines the first optical wave to a first mode over a first portion of a coupling region;

evanescently coupling the first optical wave, over the coupling region, from the first mode to a second mode confined by a second waveguide; and over at least a portion of the coupling region, rotating a polarization of an electric field of the first optical wave by approximately 90 degrees independently from an initial direction of polarization of the electric field of the first optical wave when received into the first waveguide;

where a portion of the first waveguide and a portion of the second waveguide are located in proximity to each other over the coupling region and are separated by a distance less than respective transverse spatial intensity patterns associated with the first mode and the second mode.

17. The method of claim 16, where a diameter of the first mode and a diameter of the second mode differ by at least a factor of two.

* * * * *